(12) United States Patent
Carrell

(10) Patent No.: US 6,310,554 B1
(45) Date of Patent: Oct. 30, 2001

(54) SEVERE WEATHER DETECTION APPARATUS AND METHOD OF DETECTING AND WARNING OF SEVERE WEATHER CONDITIONS

(76) Inventor: Wade J. Carrell, 2257 S. Syene Rd., Madison, WI (US) 53711-5638

( * ) Notice: Subject to any disclaimer, the term of this patent is extended or adjusted under 35 U.S.C. 154(b) by 0 days.

(21) Appl. No.: 09/374,559

(22) Filed: Aug. 13, 1999

(51) Int. Cl.$^7$ .................................................. G01W 1/00
(52) U.S. Cl. ...................... 340/601; 340/602; 340/603; 702/2; 324/72; 455/227; 367/13; 367/191; 367/135
(58) Field of Search ................................. 340/601, 602, 340/603; 702/3; 324/72; 455/227; 367/13, 191, 135

(56) References Cited

U.S. PATENT DOCUMENTS

| | | | |
|---|---|---|---|
| 4,506,211 | * | 3/1985 | Coleman .................................. 324/72 |
| 5,178,010 | * | 1/1993 | Holzel ..................................... 73/384 |
| 5,541,501 | * | 7/1996 | Shaver et al. ............................ 324/72 |
| 5,781,852 | * | 7/1998 | Gropper ................................. 455/227 |
| 5,867,805 | * | 2/1999 | Brown ..................................... 702/3 |
| 5,920,827 | * | 7/1999 | Baer et al. ............................... 702/3 |

* cited by examiner

Primary Examiner—Daniel J. Wu
Assistant Examiner—Tai T. Nguyen
(74) Attorney, Agent, or Firm—Michael Best & Friedrich LLP (57) ABSTRACT

A severe weather detection apparatus for detecting severe weather and method of detecting and warning of approaching severe weather conditions is provided. The severe weather detector apparatus includes a barometric pressure sensor and computerized means for calculating the rate of change in the barometric pressure. By monitoring and deriving a value representative of the rate of change in the barometric pressure over time, a threshold is established and compared to the current rate of change in the barometric pressure. The derived rate of change is compared to a value stored in the device which reflects approaching severe weather conditions. Rates of change which may indicate the approach of severe weather activate a voice-enunciated alarm that announces the potentially dangerous barometric activity. The severe weather detection apparatus is portable and suitable for battery power and installation in the same manner as a home smoke alarm or carbon monoxide detector. A reduced voltage 'sleep-mode' is included to allow the device to operate for extended periods of time without maintenance or user intervention.

19 Claims, 3 Drawing Sheets

Fig. 4

SEVERE WEATHER DETECTION APPARATUS AND METHOD OF DETECTING AND WARNING OF SEVERE WEATHER CONDITIONS

BACKGROUND OF THE INVENTION

The invention relates to weather sensors and a method of providing a warning of severe weather conditions. In particular, the invention relates to a battery operated severe weather detector which operates by sensing rapid rates of change in the atmospheric pressure and sounding a voice-enunciated alarm. The device is suitable for detecting and warning of approaching severe weather, including tornadoes, with sufficient timeliness and accuracy to allow the user to seek shelter before severe weather impacts.

It is commonly known in the art to use mechanical and electrical means to detect severe weather. However, these existing devices have not been able to significantly reduce the number of lives lost and amount of property damage associated with severe weather. Nationally tornadoes have killed between 15,000 and 20,000 people over the last century. Over the last decade, the average amount of property lost annually due to severe weather exceeded $1 billion nationally. While storms are monitored carefully by qualified meteorologists with sophisticated equipment and announced over radio and television, the rapid appearance of severe weather and limited access to such reports severely reduces the effectiveness of these weather detection and notification systems. As such, there exists a need for a reliable, self-contained and affordable severe weather detection device which is suitable for detecting and warning of impending severe weather.

SUMMARY OF THE INVENTION

Commonly known methods of detecting and warning of approaching severe weather are not sufficiently effective to decrease the financial and human casualties which often accompany severe weather conditions.

Known weather detection devices are not suitable for use in a portable, battery-powered device. The complicated components found in mechanical weather detection devices are too large and susceptible to physical changes over time to provide reliable warning information. Further, existing devices are susceptible to false alarms when seasonal fluctuations in the atmospheric pressure are interpreted as approaching severe weather. Existing weather detection devices also suffer from potential confusion with the alarms of other emergency detection devices. Finally, existing devices and systems for detecting severe weather are prohibitively expensive for widespread consumer use. The above disadvantages render the existing art inadequate. Exemplary devices are shown and described in U.S. Pat. Nos. 2,723,388; 3,594,753; 3,603,951; 3,631,435; 3,753,117; 4,170,132; 4,295,139; 4,602,248; 4,937,571; 5,105,191; 5,309,139; 5,402,116; and 5,612,667.

Accordingly, the present invention provides a severe weather detection apparatus and method of detecting and warning of approaching severe weather conditions. Barometric pressure is a relative value indicating the atmospheric pressure. The user is warned of changes in the barometric pressure which normally accompany the approach of severe weather. The barometric pressure of interest exists in a range from 26 to 32 inches of mercury. Storm activity, including tornadoes, are proceeded by a dramatic drop in the barometric pressure in this range.

The apparatus for detecting severe weather includes a micro-machined silicon pressure sensor and electronics for monitoring the barometric pressure. Such a sensor can be obtained at a low cost per unit and can be interchanged with a range of barometric pressure sensors. The micro-machined pressure transducer provides excellent linearity and low hysteresis. Piezoresistive strain gauges are machined onto a silicon diaphragm on the sensor in a Wheatstone bridge configuration using standardized techniques for manufacturing micro-electronic mechanical structures. A change in atmospheric pressure changes the impedance of the bridge, thereby producing a voltage output linear with atmospheric pressure. In an alternative embodiment, the bridge on the sensor can be laser trimmed to a specific barometric pressure range for better resolution. Unlike sensors used in existing mechanical barometric sensors, silicon is an elastic material which maintains its shape and functionality over years of continuous use. The durability of the silicon sensor also eliminates the need for periodic re-calibration.

The sensor output is coupled to a transducer measuring absolute pressure, which is coupled to a high performance operational amplifier. A 1.5 mA current is used to drive the transducer. Current input rather than voltage input improves the linearity of the sensor output when the sensor experiences temperature fluctuations in the environment. The amplified signal is then converted to a digital word by a digital-to-analog converter. An electronic digital memory chip stores the digital signal. The digital word is read into a microprocessor which monitors the signal from the sensor and computes a value based on the derivative of pressure data which reflects the rate of change of pressure. A sudden pressure drop is directly related to a large numerical value. Using this method, any barometric pressure drop is referenced to the pre-storm barometric pressure in the region thereby creating a floating threshold. A pre-recorded voice-enunciated alarm sounds based on a predetermined change in barometric pressure from the baseline threshold.

The Applicant's method and apparatus have numerous advantages over existing weather detection devices. First, the use of a 'floating' baseline threshold allows for the device to compensate for seasonal fluctuations in the barometric pressure which may otherwise cause missed or false alarms. Further, battery power allows the device to be easily installed in a wide range of applications. To extend battery power, all of the integrated circuits have low quiescent currents, enabling each digital integrated circuit to operate in a low-power mode during which power consumption is greatly minimized. Finally, the use of a voice-enunciated alarm allows the device to be easily distinguished from fire, security, radon, carbon monoxide or other alarms. Such a distinction must be made since people are conditioned to leave a building when most alarms go off, while the appropriate response to a severe weather alarm would be to take shelter within the building. The fact that the device is small, self-contained and powered by commercially available consumer batteries allows the device to be installed in a wide range of locations.

The invention also provides a method of detecting severe weather and a method of detecting and providing a voice enunciated warning of approaching severe weather conditions.

The Applicant's electronic microprocessor based solution to sensing severe weather provides the user with a reliable and low-cost method of protection and allows additional features to be added easily. For example, in an alternative embodiment, the severe weather detection apparatus could include a self-check feature to ensure the apparatus was functioning normally.

In an additional alternative embodiment, the severe weather detection apparatus could include display means for indicating the current barometric pressure and rate of change in the atmospheric pressure. Inclusion of such display means would assure the user that the device was functioning and allow curious users to manually monitor the barometric pressure.

In an additional alternative embodiment, the severe weather detection apparatus may include a port to allow the device to interface with a computer.

It is a principal advantage of the invention to provide a severe weather detection apparatus and method of detecting and warning of severe weather which provides the user with an accurate and timely warning of approaching weather.

It is another advantage of the invention to provide a severe weather detection apparatus that is suitable for stand-alone installation in a home or other suitable location.

It is another advantage of the invention to provide a severe weather detection apparatus that can be offered for sale at a price which will make the device available to a wide cross-section of the population.

It is yet another advantage of the invention to provide a severe weather detection apparatus with design features that allow the apparatus to operate continuously for extended periods on inexpensive and widely available consumer batteries without maintenance or user intervention.

Various other features and advantages of the invention are set forth in the following detailed description, drawings and claims.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

Figure 1:
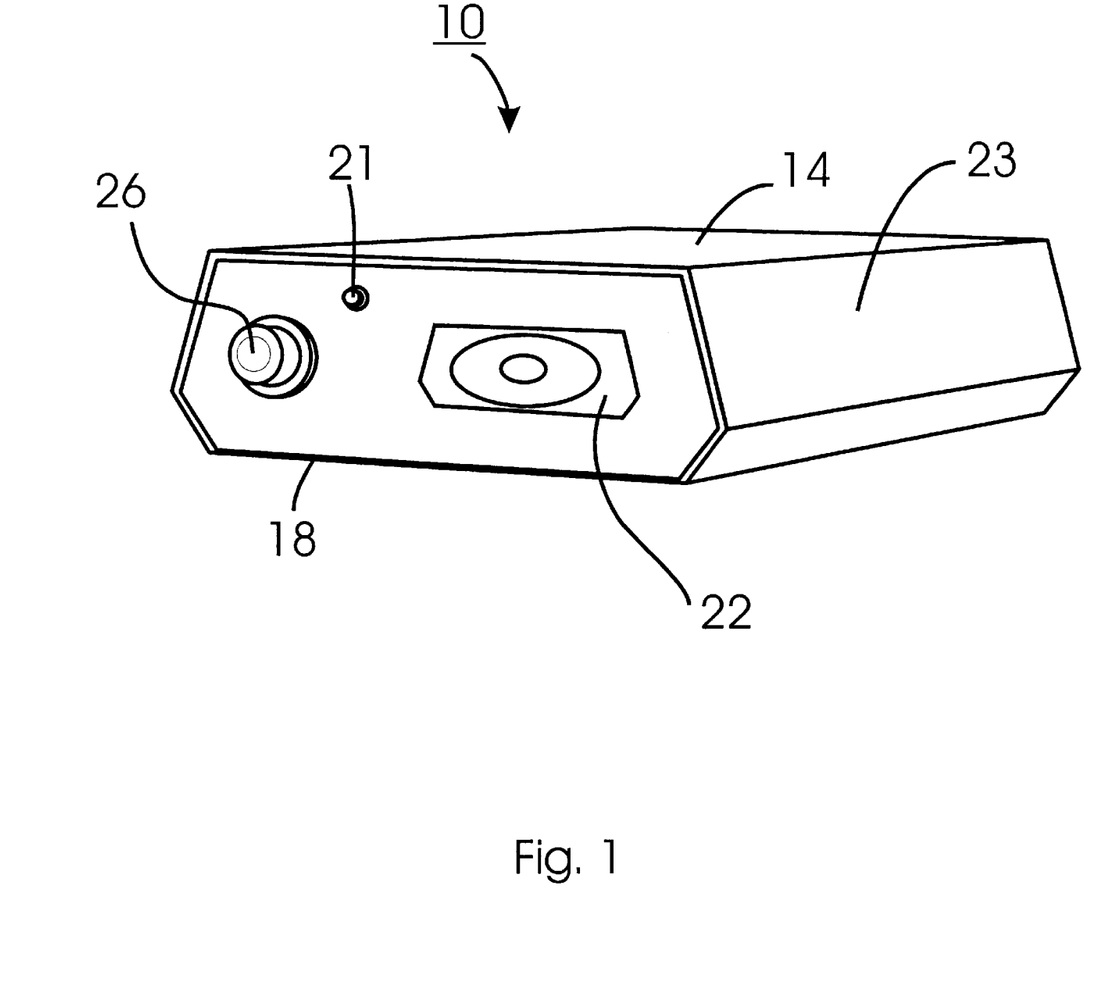
FIG. 1 is a perspective view of the invention including a suitable housing.

As seen in FIG. 1, the severe weather detection apparatus 10 embodying the invention includes a housing enclosure 14. The enclosure 14 includes a base 18 that is suitable for mounting to a wall, ceiling or other mounting surface. The enclosure 14 is manufactured from any rigid material such as plastic or metal. The enclosure 14 includes slots 22 to allow for unimpeded travel of sound waves from inside the enclosure 14. The enclosure 14 also includes a reset/test switch 21 and a removable portion 23 which provides access to the battery 70 (referenced in FIG. 2).

Figure 2:
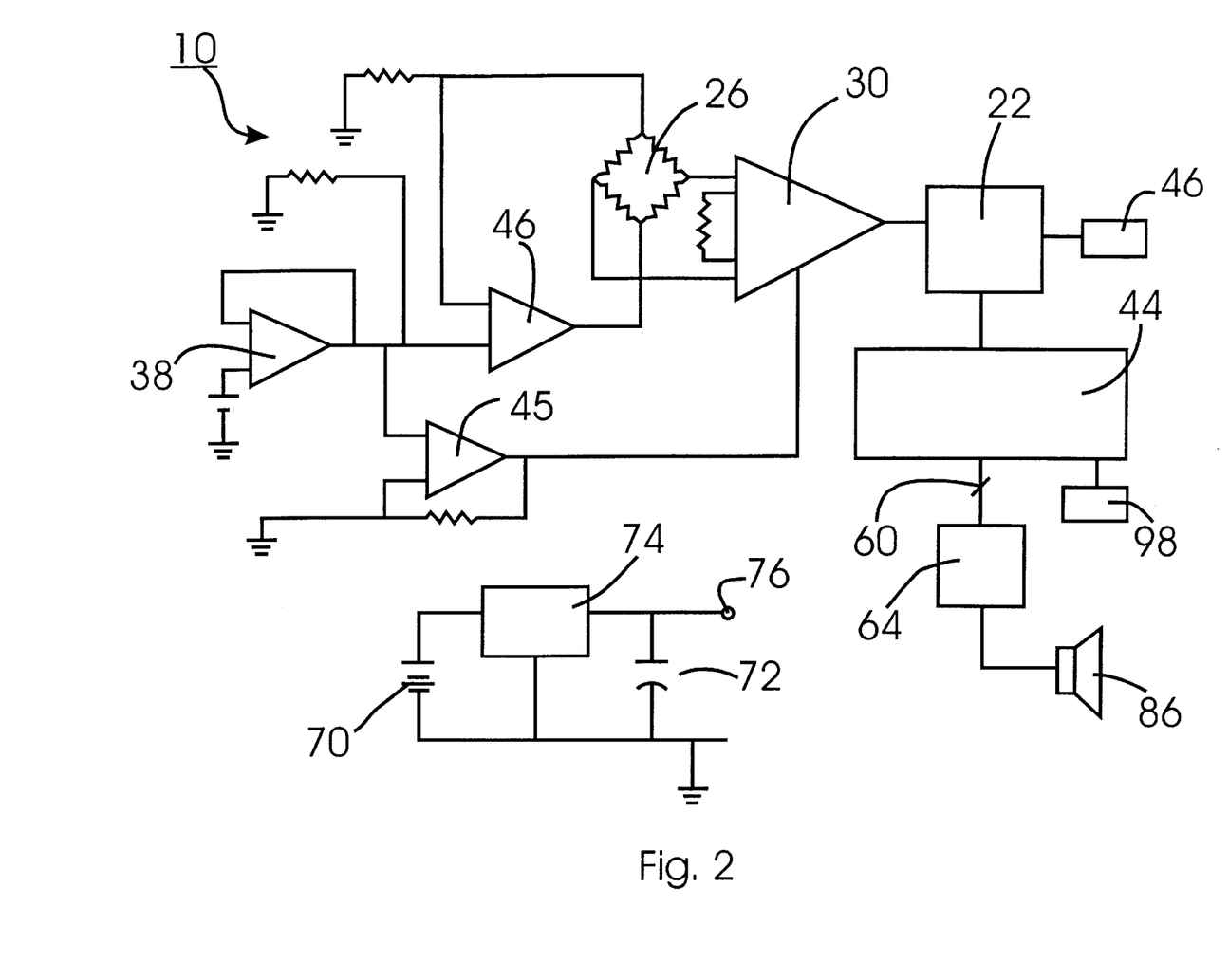
FIG. 2 is an electrical schematic of the invention.

The enclosure 14 provides protection for the components of the severe weather detector apparatus 10 schematically represented in FIG. 2. As seen in FIG. 2, the severe weather detector 10 includes a solid state micro-machined silicon transducer sensor 26 accurate to 0.0075 inches of mercury.

The transducer sensor 26 measures absolute pressure (where the reference is the pressure in a vacuum) from 0 to 15 psia. A change in the barometric pressure unbalances the strain bridge of the transducer sensor 26 producing a voltage output linear to the barometric pressure.

The severe weather detector also includes an adjustable gain amplifier 30 attached to the transducer sensor 26. An operational amplifier 46, connected in a voltage follower configuration, is attached to the reference terminal 38 of the amplifier 30. Amplifier 30 calibrates the severe weather detector apparatus at 26 inches of mercury (in Hg). In the embodiment depicted, the transducer sensor 26 is a non-amplified transducer sensor 26 with a typical full-scale voltage range of 0 to 100 mV. In an alternative embodiment (not shown), the transducer sensor 26 could include a built-in or on-board amplifier integrated into the same chip as the transducer sensor 26, thereby eliminating the need for the adjustable gain amplifier 30. In still other embodiments (not shown), the entire circuit of the severe weather detection apparatus 10 may be integrated onto a single chip.

A constant current of 1.5 mA is provided to the transducer sensor 26 by a circuit consisting of a precision reference 38, an adjustable reference buffer 45, and an independent, high quality operational amplifier 46. Regulation of the precision reference 38 is less than 0.1% with drift less than 0.002%/° C. Adjustable gain amplifier 30 amplifies the differential voltage produced by the transducer sensor 26. A single external resistor 27 sets any gain from 1 to 10,000 dB. Gain is calculated using the equation $$G = 1 + \frac{50 \text{ k}\Omega}{R_G}.$$

The common mode rejection ratio is 110 dB at a gain of 1000 dB. As embodied, adjustable gain amplifier 30 is capable of operating with a single +5V DC power supply 76 at a low quiescent current of 350 $\mu$A.

Once amplified, the signal from the transducer sensor 26 is directed to an analog-to-digital converter 22. The analog signal produced by the transducer sensor 26 is transformed into a 12 bit digital word by the analog-to-digital converter 22 where each bit is one millivolt of input. The 12 bit millivolt signal is amplified to 4.096VDC at full scale to interface by the analog-to-digital converter 22. The analog-to-digital converter 22 has an 8.5 $\mu$s successive approximation and includes a 4.096VDC on-chip buffered reference (not shown) and a serial interface 48. As depicted, the analog-to-digital converter 22 includes a low-power setting during which the converter 22 draws only 2 $\mu$A of power.

The analog-to-digital converter 22 of the severe weather detector as depicted interfaces with a micro-controller 44. As depicted, the micro-controller 44 is an eight-bit micro-controller 44 with a high speed RISC (reduced instruction set computing) core, 25 bytes of RAM 102, 512 words of program memory and a plurality of input/output pins (not shown).

Micro-controller 44 includes a timer 98 which controls the micro-controller's 44 sampling rate when activated. The micro-controller 44 operates at a current less than 1 $\mu$A between samples. An internal interrupt created by an overflow of the timer 98 causes activation of the micro-controller 44.

The severe weather detector 10 further includes an alarm generated by a single-chip voice playback module 64 with nonvolatile memory providing zero-power message storage. The alarm is enunciated by an 8 ohm speaker 86 connected to the voice-playback module 64. The voice playback module 64 accepts a switch signal 60 to activate the voice playback module 64. Speaker-86 reproduces the recorded message from the voice playback module 64 at volumes up to 80dB. When inactive, the voice playback module 64 automatically enters into a lower power consumption sleep mode with a quiescent current of less than 1 μA.

Power is provided to the severe weather detector 10 through a nine-volt battery 70. A linear regulator 74 regulates the power and drops the power supply 76 output down to 5V DC to power the severe weather detector 10. The linear regulator 74 operates within 5% of 5V DC over the entire operational temperature range. A 100 μF electrolytic capacitor 72 minimizes the voltage ripple.

Figure 3:
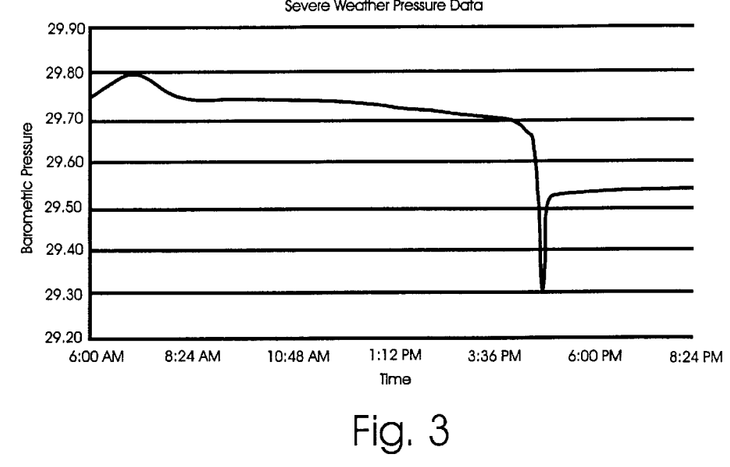
FIG. 3 depicts barometric pressure data indicative of approaching severe weather.
Figure 4:
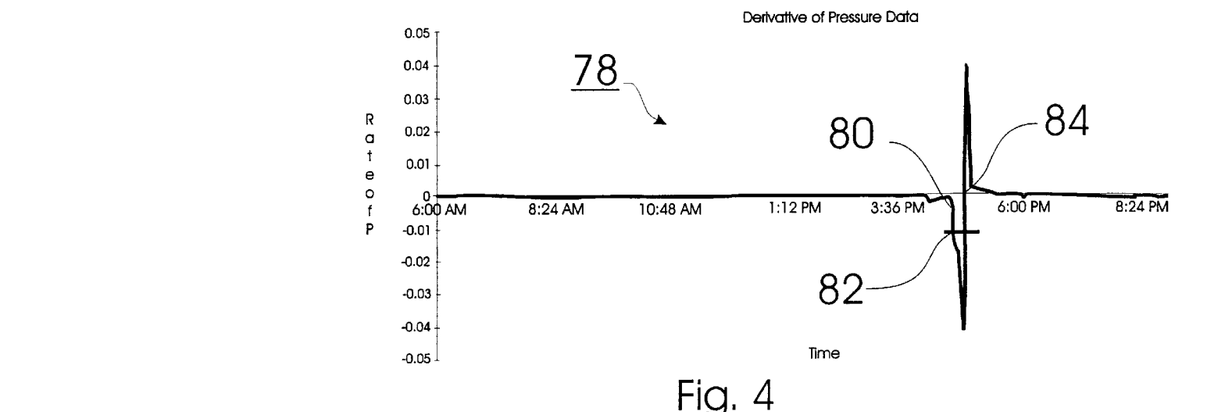
FIG. 4 depicts a four-point derivative of the data contained in FIG. 2.

In operation, the transducer sensor 26 produces a voltage output indicative of the actual ambient barometric pressure. The micro-controller 44 samples the output produced by the transducer sensor 26 and determines the presence of severe weather by comparing the sensor output to the floating threshold established by the derivation of barometric pressure readings shown in FIG. 4 made by the transducer sensor 26. Specifically, the timer 98 connected to the micro-controller 24 creates an interrupt every minute, waking up the controller 44 from the low power mode. The controller 44 polls the analog-to-digital converter 22, which performs a conversion and serially transmits the result to the micro-controller 44. In the micro-controller 44, a Finite Impulse Response (FIR) filter implemented in micro-controller's 44 software computes a four-point derivative 78 from the barometric pressure. FIG. 3 depicts barometric pressure data collected over time before, during and after a storm. The derivative 78 of the data from FIG. 3 is plotted in FIG. 4. The derivative 78 is calculated using 4 points spanning a time base of 4 minutes. When the derivative is negative (shown as 80 in FIG. 4), a low pressure front is approaching, indicating the possibility of approaching severe weather. The magnitude of the derivative 78 can be directly correlated to the severity and the distance of the approaching severe weather. When the barometric pressure changes at a rate of 0.2 inches of mercury per hour (shown as 82 in FIG. 4) or greater, severe weather is imminent. At this point 82, the micro-controller 44 continuously monitors the derivative 78 for two minutes. If, after two minutes, the derivative 78 is still increasing, the micro-controller 44 asserts an input/output (I/O) pin switch signal 60 (shown in FIG. 2) which activates the voice playback module 64 (also shown in FIG. 2). As embodied, the voice playback module 64 shown in FIG. 2 alternately produces through the speaker 86 an 80dB alarm and the message recorded on the voice playback module 64, warning the user of the approaching weather and instructing the user to seek shelter. The alarm message continues until the derivative 78 falls below the predetermined level 82, changes sign 84, or the unit is manually reset or shut off.

In other embodiments (not shown), the severe weather detection apparatus 10 may include display means 100 for reporting the barometric pressure or diagnostic means (not shown) for monitoring the operation of the device 10. Such alternative embodiments may include any type of known display means and hardware or software-based error-checking methods.

Various features and advantages of the invention are set forth in the following claims.

What is claimed is:

1. A severe weather detecting apparatus comprising:
   a sensor for detecting a physical characteristic of the ambient environment and generating a signal representative of the physical characteristic;
   a microprocessor connected to said sensor for processing said signal, said microprocessor including a digital-signal processor for measuring variations of said signal, converting said variations into a rate of change value indicating the likelihood of severe weather, and generating an output signal if said rate of change value increases for a predetermined period of time; and
   a voice-enunciated notification module connected to said microprocessor to receive the output signal and for providing a warning of severe weather, said notification module including a speaker for broadcasting a voice-enunciated alarm, the voice-enunciated alarm including a warning that severe weather is approaching and an instruction to seek shelter,
   wherein said voice-enunciated alarm is broadcast until said rate of change value falls below a predetermined value.

2. The severe weather detecting apparatus of claim 1 wherein said sensor is a pressure transducer for measuring barometric pressure.

3. The severe weather detecting apparatus of claim 1 further including amplification means for intensification of said signal produced by said sensor.

4. The severe weather detecting apparatus of claim 1 further including an analog-to-digital converter connected between said sensor and said microprocessor.

5. The severe weather detecting apparatus of claim 4 wherein said apparatus further includes:
   a timer connected to said analog-to-digital converter;
   a memory connected to said analog-to-digital converter; and
   display means connected to said microprocessor for displaying said rate of change value.

6. A method of detecting severe weather, said method comprising the acts of:
   monitoring barometric pressure;
   generating a signal representing barometric pressure values;
   comparing the barometric pressure values over time to establish a baseline barometric value;
   deriving a threshold value based on the baseline barometric value;
   comparing successive barometric pressure values against the threshold value to determine whether a rate of change of the successive barometric pressure values falls below or above the threshold value;
   broadcasting a voice-enunciated alarm of severe weather based on the comparison and when the rate of change increases for a predetermined period of time, the alarm including a warning that severe weather is approaching and an instruction to seek shelter; and
   stopping the broadcast of the voice-enunciated alarm when the rate of change falls below a predetermined value.

7. The method of claim 6 including the additional step of adjusting said threshold value for rejecting minor seasonal weather disturbances.

8. A method of monitoring weather and notifying the user of severe weather, the method comprising the acts of:
   detecting barometric pressure;
   generating a signal representative of the barometric pressure;
   processing the signal to measure variations in the barometric pressure;

converting the variations into a rate of change value indicating the likelihood of severe weather;

alerting the user via a voice-enunciated alarm, when the rate of change value exceeds a barometric pressure threshold for a predetermined period of time, that severe weather is approaching and to seek shelter; and ending the alert via the voice-enunciated alarm when the rate of change value falls below a predetermined value.

9. The method of claim 8 further including the step of amplifying the generated barometric pressure signal.

10. The method of claim 8 further including the step of converting the barometric pressure signal from analog to digital after generating the signal and before processing the signal.

11. A severe weather detecting apparatus comprising:

a sensor for detecting barometric pressure and for generating a signal representing barometric pressure values;

a micro-controller connected to the sensor for comparing the barometric pressure values over time to establish a baseline barometric value, for deriving a threshold barometric value based on the baseline barometric value, and for comparing successive barometric pressure values against the threshold value to determine whether the successive barometric pressure values fall above or below the threshold value; and an alarm for providing a voice warning of severe weather based on the comparison between the successive barometric pressure values and the threshold value and when the rate of change value exceeds the threshold value for a predetermined time, the voice warning including an instruction to seek shelter, wherein the alarm is deactivated when the rate of change value falls below a predetermined value.

12. The severe weather detecting apparatus of claim 11, further including an amplifier for intensification of the signal generated by the sensor.

13. The severe weather detecting apparatus of claim 11, further including an analog-to-digital converter connected between the sensor and the microprocessor.

14. The severe weather detecting apparatus of claim 13, wherein the apparatus further includes:

a timer connected to the analog-to-digital converter;

a memory connected to the analog-to-digital converter; and a display connected to the microprocessor for displaying the barometric pressure values.

15. A battery-operated severe weather detecting apparatus comprising:

a sensor for detecting barometric pressure;

an amplifier connected to the sensor;

an analog-to-digital converter connected to the amplifier;

a micro-controller connected to the analog-to-digital converter, the micro-controller operable to generate an output signal when a rate of change of barometric pressure values increases for a predetermined period of time; and a voice playback module connected to the micro-controller to receive the output signal, the voice playback module operable to generate an alarm including a warning that severe weather is approaching and an instruction to seek shelter, wherein the voice playback alarm is broadcast until the rate of change value falls below a predetermined value and further wherein the current draw of the severe weather detecting apparatus is less than about 2 milliamps.

16. The severe weather detecting apparatus of claim 15 further including a timer and a memory connected to the analog-to-digital converter.

17. The severe weather apparatus of claim 15 wherein the current draw of the severe weather detecting apparatus is less than about 1.85 milliamps.

18. A battery-operated severe weather detecting apparatus comprising:

a sensor for detecting barometric pressure;

an amplifier connected to the sensor;

an analog-to-digital converter connected to the amplifier;

a micro-controller connected to the analog-to-digital converter, the micro-controller operable to generate an output signal if a rate of change of barometric pressure values increases for a predetermined period of time; and a voice playback module connected to the micro-controller to receive the output signal, the voice playback module operable to generate an alarm including a warning that severe weather is approaching and an instruction to seek shelter, wherein the severe weather detecting apparatus operates for more than one year when powered by battery.

19. The severe weather detecting apparatus of claim 18 wherein the battery is a 9 Volt battery.

* * * * *

UNITED STATES PATENT AND TRADEMARK OFFICE
CERTIFICATE OF CORRECTION

PATENT NO.     : 6,310,554 B1
DATED          : October 30, 2001
INVENTOR(S)    : Carrell It is certified that error appears in the above-identified patent and that said Letters Patent is hereby corrected as shown below:

<u>Title page,</u>
The Title page, showing an illustrated figure, should be deleted and substitute therefor the attached Title page.
Item [56], U.S. PATENT DOCUMENTS, please add the following references:

|   |   |   |   |   |
|---|---|---|---|---|
| -- | 2,723,388 | 11/08/1955 | J.H. Jacobs | 340/236 |
|   | 3,594,753 | 07/20/1971 | Elenbaas | 340/236 |
|   | 3,603,951 | 09/07/1971 | Bracken et al. | 340/224 |
|   | 3,631,435 | 12/18/1971 | Elenbaas | 340/236 |
|   | 3,753,117 | 08/14/1973 | Downing et al. | 325/364 |
|   | 4,170,132 | 10/09/1979 | Serley | 73/178T |
|   | 4,295,139 | 10/13/1981 | Arpino | 340/870.01 |
|   | 4,602,248 | 07/22/1986 | Foster et al. | 340/601 |
|   | 4,662,210 | 05/05/1987 | D'Aoust | 73/19 |
|   | 4,812,825 | 03/14/1989 | Kennedy et al. | 340/601 |
|   | 4,835,536 | 05/30/1989 | Piesinger et al. | 342/26 |
|   | 4,920,263 | 04/24/1990 | Fimian et al. | 250/255 |
|   | 4,937,571 | 06/26/1990 | Bonafe | 340/968 |
|   | 5,105,191 | 04/14/1992 | Keedy | 340/968 |
|   | 5,309,139 | 05/03/1994 | Austin | 340/462 |
|   | 5,402,116 | 03/28/1995 | Ashley | 340/870.1 |
|   | 5,612,667 | 03/18/1997 | Trumpy et al. | 340/425.5 |
|   | 5,880,836 | 03/09/1999 | Lonnqvist | 356/336 -- |

<u>Drawings,</u>
Delete drawing sheet 2, and substitute therefor drawing sheet 2 consisting of figures 2, as shown on the attached pages.

Signed and Sealed this

Nineteenth Day of November, 2002

*Attest:*

*Attesting Officer*

JAMES E. ROGAN
*Director of the United States Patent and Trademark Office*

(12) United States Patent
Carrell (10) Patent No.: US 6,310,554 B1
(45) Date of Patent: Oct. 30, 2001

(54) SEVERE WEATHER DETECTION APPARATUS AND METHOD OF DETECTING AND WARNING OF SEVERE WEATHER CONDITIONS

(76) Inventor: Wade J. Carrell, 2257 S. Syene Rd., Madison, WI (US) 53711-5638

( * ) Notice: Subject to any disclaimer, the term of this patent is extended or adjusted under 35 U.S.C. 154(b) by 0 days.

(21) Appl. No.: 09/374,559

(22) Filed: Aug. 13, 1999

(51) Int. Cl.[7] .................................................. G01W 1/00
(52) U.S. Cl. ........................ 340/601; 340/602; 340/603; 702/2; 324/72; 455/227; 367/13; 367/191; 367/135
(58) Field of Search ..................................... 340/601, 602, 340/603; 702/3; 324/72; 455/227; 367/13, 191, 135

(56) References Cited

U.S. PATENT DOCUMENTS

| | | | | |
|---|---|---|---|---|
| 4,506,211 | * | 3/1985 | Coleman | 324/72 |
| 5,178,010 | * | 1/1993 | Holzel | 73/384 |
| 5,541,501 | * | 7/1996 | Shaver et al. | 324/72 |
| 5,781,852 | * | 7/1998 | Gropper | 455/227 |
| 5,867,805 | * | 2/1999 | Brown | 702/3 |
| 5,920,827 | * | 7/1999 | Baer et al. | 702/3 |

* cited by examiner

Primary Examiner—Daniel J. Wu
Assistant Examiner—Tai T. Nguyen
(74) Attorney, Agent, or Firm—Michael Best & Friedrich LLP (57) ABSTRACT

A severe weather detection apparatus for detecting severe weather and method of detecting and warning of approaching severe weather conditions is provided. The severe weather detector apparatus includes a barometric pressure sensor and computerized means for calculating the rate of change in the barometric pressure. By monitoring and deriving a value representative of the rate of change in the barometric pressure over time, a threshold is established and compared to the current rate of change in the barometric pressure. The derived rate of change is compared to a value stored in the device which reflects approaching severe weather conditions. Rates of change which may indicate the approach of severe weather activate a voice-enunciated alarm that announces the potentially dangerous barometric activity. The severe weather detection apparatus is portable and suitable for battery power and installation in the same manner as a home smoke alarm or carbon monoxide detector. A reduced voltage 'sleep-mode' is included to allow the device to operate for extended periods of time without maintenance or user intervention.

19 Claims, 3 Drawing Sheets

Fig. 2